No. 782,783. PATENTED FEB. 14, 1905.
J. W. LATIMER.
MOWING MACHINE.
APPLICATION FILED SEPT. 7, 1904.
3 SHEETS—SHEET 1.
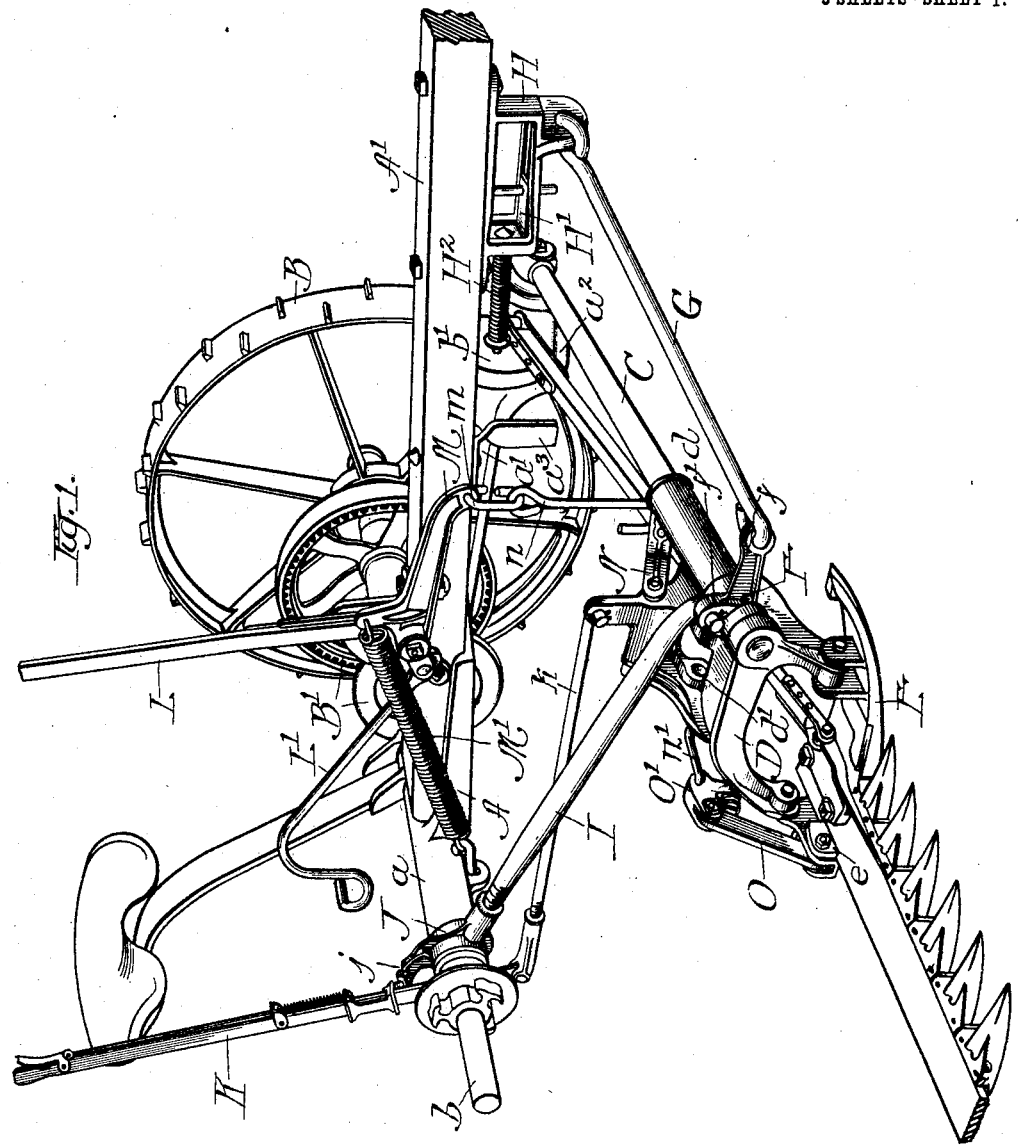
Witnesses:
Inventor:
John W. Latimer
By Chas. N. Chambers
Attorney.

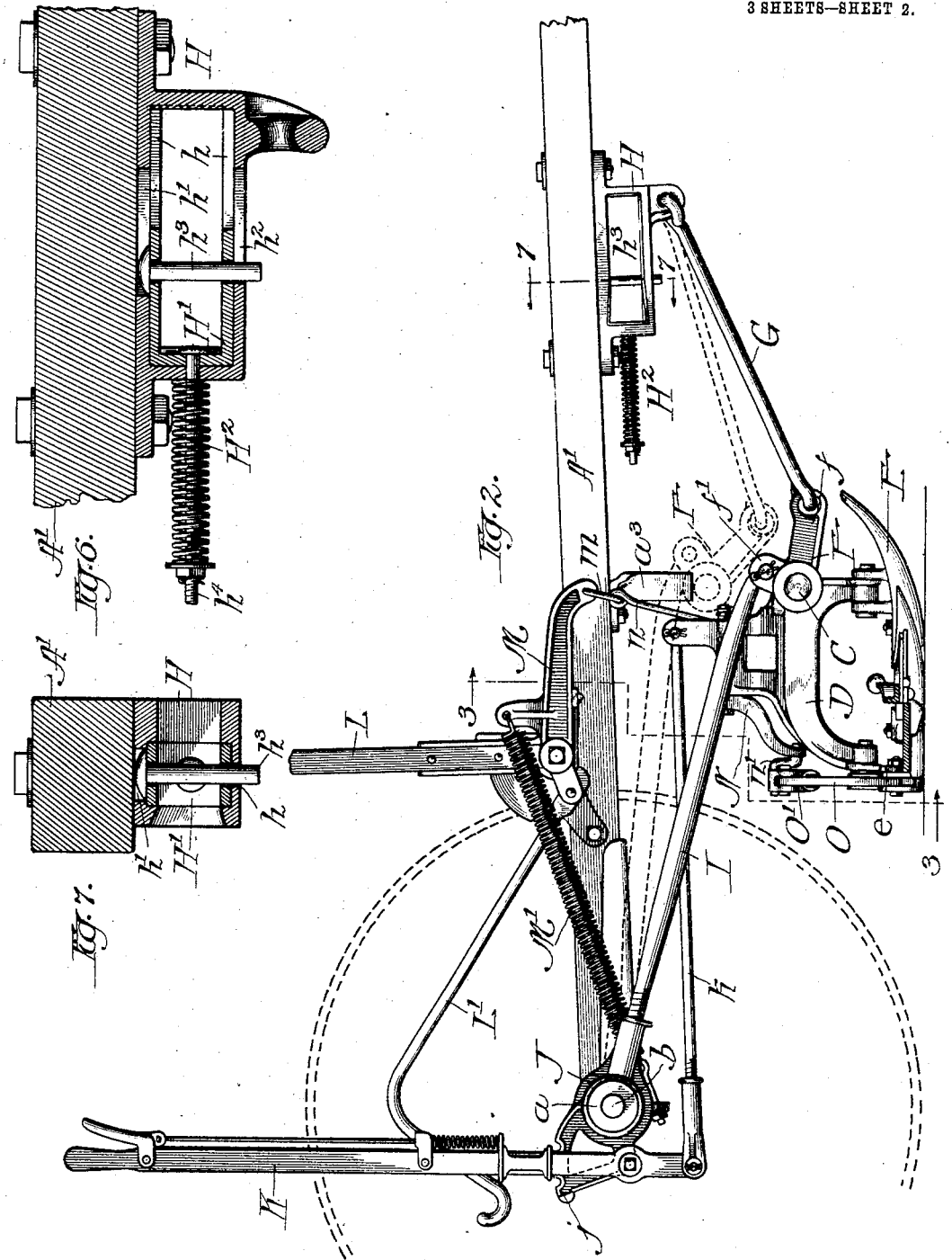

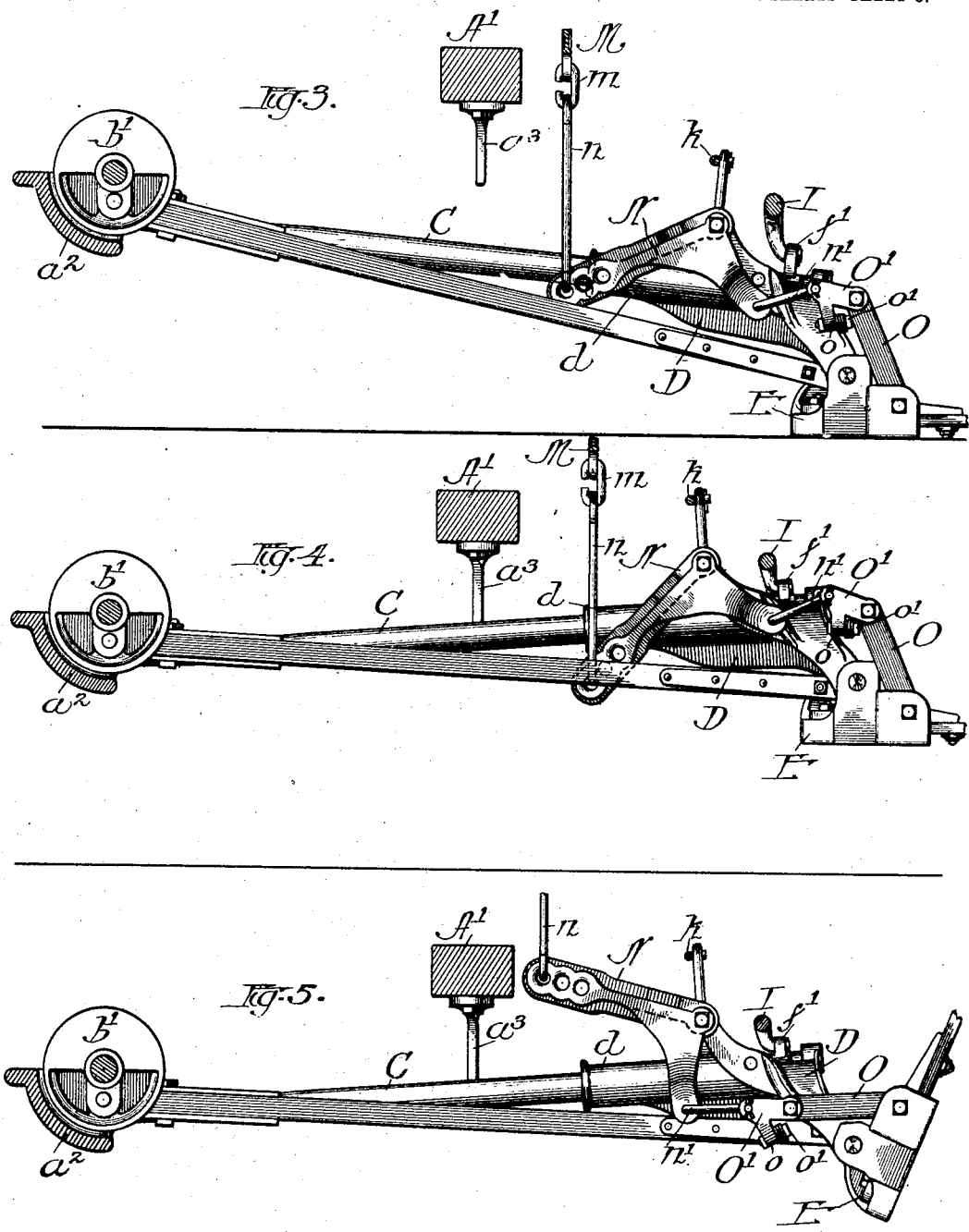

No. 782,783.                                              Patented February 14, 1905.

UNITED STATES PATENT OFFICE.

JOHN W. LATIMER, OF CHICAGO, ILLINOIS, ASSIGNOR TO INTERNATIONAL HARVESTER COMPANY, OF CHICAGO, ILLINOIS, A CORPORATION OF NEW JERSEY.

MOWING-MACHINE.

SPECIFICATION forming part of Letters Patent No. 782,783, dated February 14, 1905.

Application filed September 7, 1904. Serial No. 223,582.

*To all whom it may concern:*

Be it known that I, JOHN W. LATIMER, a citizen of the United States, and a resident of Chicago, in the county of Cook and State of Illinois, have invented certain new and useful Improvements in Mowing-Machines, of which the following is a specification sufficiently clear and exact to enable those skilled in the art to which it appertains to make and use the same.

The invention relates to mowing-machines, and more especially to the coupling-frame and draft connection for such machines and the means for adjusting the finger-bar connected with the coupling-frame. Its object is to improve the construction and operation of a mower by providing a coupling-frame comprising a coupling-bar, a coupling-yoke sleeved thereon, a push-bar and a draft-rod which are connected thereto by means of a compensating lever; by providing an adjustable swivel-socket for the push-bar which is pivoted upon an axle in common with the main axle; by providing a tilting lever and a ratchet-quadrant therefor which are mounted upon the push-bar or part integral therewith; by providing a draft-bracket, to which the draft-rod is connected, which has a yielding connection with the draft-equalizer, and by providing a connection between the lifting-lever and the finger-bar which comprises a lifting-standard pivotally mounted upon the finger-bar having an adjustable arm pivoted thereto, and a bell-crank mounted upon the coupling-yoke, one arm of which is connected with the lifting-lever and the other with the adjustable arm of the lifting-standard.

Other improvements in the construction will be made evident as the description proceeds.

In mowers having the usual push-bar, the tendency at moments of highest duty is to raise one or the other of the traction-wheels off the ground, thus reducing their tractive power. In mowers in which the push-bar is replaced by a draft-rod the tendency at such a time is to raise the finger-bar off the ground, thereby cutting a high stubble and placing a heavy load upon the horses' necks. The improvement herein shown overcomes all of these objections in a more effective manner than any heretofore designed to accomplish the same result. The manner of mounting the tilting lever has decided advantages over that of any prior one in that it is pivoted to a part integral with the coupling-frame and coöperates therewith in such a manner that when the finger-bar is raised off the ground it is neither tilted nor swung in either direction, any of which movements are obviously more or less objectionable. It is raised vertically a limited distance and maintains otherwise substantially the same relation with the ground. The adjustable connection between the lifting-lever and the finger-bar provides means for raising finger-bars of different lengths with equal facility and for raising the bar horizontally or the outer end in advance of the inner. The parts are so proportioned also that the leverage varies in proportion to the force required to raise the finger-bar to its vertical position, thus rendering the parts smooth and perfect in their operation.

The invention is illustrated in the accompanying drawings, forming a part hereof, in which like characters of reference designate like parts.

Referring to the drawings, Figure 1 is a perspective view of as much of a mower as is necessary to show the application of the invention. For the sake of clearness the machine is shown with the inner traction-wheel removed. Fig. 2 is a side elevation of a portion of the parts shown in Fig. 1, showing the operation of the compensating lever connecting the push-bar and draft-rod. Fig. 3 is a sectional elevation of a portion of the coupling-frame, taken on planes indicated by broken line 3 3 of Fig. 2, showing the parts in the position they assume when the finger-bar is upon the ground. Fig. 4 is a view corresponding to Fig. 3, showing the finger-bar raised horizontally from the ground. Fig. 5 is a view corresponding to Fig. 4, showing the finger-bar raised almost to its vertical position. Fig. 6 is a longitudinal sectional elevation of the draft-bracket, taken on a plane passing through the center thereof. Fig. 7 is a transverse sectional elevation of the draft-bracket, taken on a plane indicated by line 7 7 of Fig. 2.

The invention is shown in Fig. 1 of the illustrations as applied to a mower of the usual type, having the main frame A, which is mounted upon two supporting traction-wheels B, one only of which is shown, and the draft-tongue A' rigidly secured thereto, upon which is mounted the usual draft-equalizer (not shown) and lifting-levers, to which reference will be made later. The main frame is provided with the usual transverse tubular portion $a$, forming a bearing for the main axle $b$, the longitudinal tubular portion $a'$, in which the crank-shaft is journaled, and suitable housings for the bearings of the gearing B' for driving the cutter-bar. The usual crank-wheel $b'$ is provided with a shield $a^2$, integral with the tubular portion $a'$, to which is pivoted the coupling-bar C, extending transversely of the machine. Upon the inner end of this coupling-bar is sleeved the coupling-yoke D, to which the shoe E, carrying the finger-bar, is pivoted in the usual manner. All of these parts thus far described are common to machines of this type, and hence further description of them is unnecessary. The coupling-yoke being considerably lower than the main frame, it is desirable that the parts connecting it therewith be so constructed that a resultant of the forces acting through these parts at moments of highest duty will not produce a tendency to raise either wheel or the cutting apparatus off the ground, nor pull heavily upon the horses' necks. If a push-bar of the usual type is provided, there is a tendency to raise one or the other of the wheels at such a time, and if a draft-rod of the usual type is used in its stead the tendency is to raise the finger-bar, cutting a high stubble, and to place an excessive load on the necks of the horses, all of which are objectionable. The combination of these two means for connecting the finger-bar with the main frame, as herein shown, very effectively overcomes the disadvantages above mentioned. The parts are constructed also so that they will not interfere with the free operation of a pitman of any desired form.

Pivoted upon the coupling-bar is the compensating lever F, which is herein shown located in an opening between two parts of the sleeve $d$ of the coupling-yoke. This compensating lever is provided with a forward-extending arm $f$, to which one end of the draft-rod G is attached, the other end of which is attached to the draft-bracket H, secured to the tongue. The compensating lever is also provided with an upward-extending arm $f'$, to which the forward end of the push-bar I is pivoted, the rear end of which is pivotally connected with the main frame. This connection is preferably effected by means of a socket J, which is sleeved upon the tubular portion $a$ of the main frame upon an axis in common with the main axle. In order that the coupling-frame may be raised to raise the finger-bar from the ground, it is necessary that the socket J have a swivel connection with the push-bar I, since the coupling-bar C is pivoted upon an axis at a right angle with the axis of the socket. The parts would otherwise have to be very loosely joined together, which would be objectionable. It is desirable that the push-bar be made adjustable in its length to compensate for variations in manufacture in order to be able to properly aline the cutter-bar with the crank-wheel. This adjustment is preferably provided by screwing the push-bar into the socket, thereby providing at the same time the swivel connection above referred to.

From the above description of the construction of the several parts it will be seen that the resistance of the finger-bar is distributed to different portions of the machine and that the forces overcoming this resistance act in such a manner that neither the finger-bar nor the wheels are raised off the ground, nor is an excessively-heavy load placed upon the necks of the horses. When the coupling-frame is raised, the coupling-yoke rises in a vertical plane, the compensating lever accommodating the radial movements of the push-bar and draft-rod, as shown in Fig. 2.

By locating the push-bar above the coupling-yoke ample room is left beneath for the free operation of any desired form of pitman. The usual rigid pitman, as herein shown, may be used or the jointed pitman, as shown in my Patent No. 727,644, issued May 12, 1903, a bearing $d'$ for the vibrating hanger of which is provided in the coupling-yoke.

The tilting lever K is mounted upon the socket J and is provided with the ratchet-quadrant $j$, integral with said socket. This lever is connected with the coupling-yoke in the usual manner by means of the tilting rod $k$. By these means when the coupling-frame is raised the finger-bar is raised in a vertical plane, maintaining otherwise substantially the same relation with the ground—that is, it is raised without tilting or swinging in either direction, the movement of the tilting lever compensating for the radial movement of the tilting rod, thereby overcoming objections to the operation of similar devices heretofore constructed.

The means for raising the finger-bar to a vertical position consists in the hand-lever L, mounted upon the draft-tongue, and its coöperating foot-lever L'. Both of these levers are connected with a compensating lifting-lever M, to which is connected the counterbalancing-spring M'. All of these parts are constructed and operated in the usual manner. Mounted upon the coupling-yoke D is the bell-crank N, one arm of which is connected to the compensating lifting-lever M by means of links $m$ and $n$. Pivotally mounted upon the shoe E is the lifting-standard O, which is provided with an adjustable arm O', pivoted to its upper end, as shown in Figs. 3, 4, and 5. To this adjustable arm the other arm of the bell-crank N is connected by means of the link $n'$. This arm O' is provided with a lateral projection $o$, which carries an adjustable bolt $o'$, adapted to contact with the lifting-standard, whereby its operative length may be increased or diminished at will. These parts are so proportioned that the leverage upon the finger-bar is made variable, so as to compensate for the variation in the force required to move it upon its pivot from a horizontal to a vertical position. As shown in the drawings, the adjustable arm is set so that the finger-bar is raised horizontally until the coupling-bar engages a suitable stop $a^3$, secured to the draft-tongue, when upon further operation of the lifting-lever the finger-bar is raised to a vertical position. When in the vertical position, the stop $e$ engages the coupling-yoke and prevents the finger-bar from falling so far inward that it will not return to the horizontal position when lowered. If it is desired to raise the outer end of the finger-bar first or to use a longer or heavier bar, the operative length of the lifting-standard will need to be increased, or if a shorter bar is used it will need to be lessened. By these means a wide range of adjustment is provided, whereby the finger-bar is raised easily and without undue strain upon any of the parts and returned in like manner to the working position. The driving-gearing may be thrown out of operation when the finger-bar is raised, either by manual means or the machine may be provided with one of the many devices for throwing it out automatically, as shown in patents to E. A. Johnston and B. R. Benjamin, No. 578,404, dated March 9, 1897, or E. A. Johnston, No. 728,580, dated May 19, 1903.

If desired, a jointed pitman of the type above referred to may be employed whereby the cutter is rendered inoperative without throwing the machine out of gear.

The draft-bracket H, secured to the tongue, is provided with channels $h$ upon its inner sides in which slides a clevis H'. (See Figs. 6 and 7.) Openings $h'$ and $h^2$ are provided in the upper and lower sides, respectively, for the clevis-pin $h^3$, by which a draft-equalizer, of any desired form, is connected in the usual manner. The spring $H^2$, located upon the bolt $h^4$, provides a yielding connection between the clevis and the draft-bracket whereby any undue strain upon the machine is lessened.

Having thus described my invention, what I claim as new, and desire to secure by Letters Patent, is—

1. In a mower, the combination with the main frame, of a push-bar, and a socket pivoted on the main frame on an axis in common with the main axle and having a swivel connection with said push-bar.

2. In a mower, the combination with the main frame, of a push-bar, and a socket pivoted on the main frame on an axis in common with the main axle and having an adjustable connection with said push-bar.

3. In a mower, the combination with the main frame of a push-bar, a socket for said push-bar pivoted on the main frame and having a ratchet-quadrant integral therewith, and a tilting lever mounted upon said socket.

4. In a mower, the combination with the main frame, of a push-bar, a socket pivoted on the main frame and having an adjustable swivel connection with said push-bar, a ratchet-quadrant integral with said socket, and a tilting lever mounted upon said socket.

5. In a mower, the combination with the main frame, of a coupling-bar connected therewith a compensating lever pivoted on said bar, a push-bar connected with said lever, a socket pivoted on the main frame on an axis in common with the main axle, and having an adjustable connection with said push-bar, and a draft-rod also connected with said lever and a part integral with the main frame.

6. In a mower, the combination with the main frame, of a coupling-bar connected therewith, a compensating lever pivotally connected with said bar having an upward and a forward extending arm, a push-bar pivoted to said upward-extending arm, a swivel connection between said push-bar and the main frame, and a draft-rod pivoted to said forward-extending arm, and to a part integral with the main frame.

7. In a mower, the combination with the main frame, of a coupling-bar pivoted thereon, a compensating lever pivoted on said bar, a push-bar pivoted to said lever, a socket pivoted on the main frame on an axis in common with the main axle and having an adjustable swivel connection with said push-bar, a draft-rod also pivoted to said lever and a part integral with the main frame, a coupling-yoke sleeved on said coupling-bar, and a tilting lever mounted upon said socket and connected with said yoke.

8. In a mower, in combination with the draft-tongue and the coupling-frame, a draft connection comprising a draft-bracket rigidly secured to the tongue, a connection between said bracket and said coupling-frame, a draft-equalizer, and a yielding connection between said bracket and equalizer.

9. In a mower, in combination with the main frame and the coupling-frame, a lifting-lever mounted upon the main frame or part integral therewith, a finger-bar pivotally connected with the coupling-frame, a lifting-standard pivotally connected with said finger-bar, and an arm having a stop pivoted to said standard and connected with said lever.

10. In a mower, in combination with the main frame and the coupling-frame, a lifting-lever mounted upon the main frame or part integral therewith, a coupling-yoke mounted upon the coupling-frame, a finger-bar pivoted to said yoke, a lifting-standard pivotally connected with said finger-bar, an arm having an adjustable stop pivoted to said standard, and a bell-crank mounted upon said yoke, one arm of which is connected with said adjustable arm, and the other with said lever.

11. In a mower, the combination with the main frame, of a coupling-bar pivoted thereon, a compensating lever pivoted on said bar, a push-bar pivoted to said lever, a socket pivoted on the main frame on an axis in common with the main axle and having an adjustable swivel connection with said push-bar, a draft-rod also pivoted to said lever and to a part integral with the main frame, a coupling-yoke sleeved on said coupling-bar, a tilting lever mounted upon said socket and connected with said yoke, a lifting-lever mounted upon the main frame, or part integral therewith, a finger-bar pivoted to said yoke, a lifting-standard pivotally connected with said finger-bar, an adjustable arm pivoted to said standard, and a bell-crank mounted upon said yoke, one arm of which is connected with said adjustable arm, and the other with said lever.

In testimony whereof I have signed my name to this specification in the presence of two subscribing witnesses.

JOHN W. LATIMER.

Witnesses:
 OSCAR A. ANDERSON,
 CLARA SCHEND.